United States Patent [19]

Tsugawa

[11] Patent Number: 4,826,092
[45] Date of Patent: May 2, 1989

[54] COIL WINDING MACHINE FOR ARMATURES

[75] Inventor: Takayuki Tsugawa, Kaisei, Japan

[73] Assignee: Odawara Engineering Company Limited, Kanagawa, Japan

[21] Appl. No.: 69,829

[22] Filed: Jul. 6, 1987

[30] Foreign Application Priority Data

Sep. 22, 1986 [JP] Japan .................................. 61-224323

[51] Int. Cl.[4] .............................................. H02K 3/38
[52] U.S. Cl. .................................. 242/7.05 B; 29/597; 29/564.5; 29/735
[58] Field of Search ...................... 242/5, 7.03, 7.05 R, 242/7.05 B, 705 C; 29/564.5, 596, 597, 735

[56] References Cited

U.S. PATENT DOCUMENTS

| 3,713,598 | 1/1973 | Bucholtz et al. | 29/597 X |
| 3,812,577 | 5/1974 | Compton et al. | 242/7.05 B X |
| 3,857,172 | 12/1974 | George et al. | 242/7.03 X |
| 4,541,170 | 9/1985 | Barrera | 242/7.05 B X |
| 4,633,577 | 1/1987 | Banner | 29/597 |

Primary Examiner—David Werner
Attorney, Agent, or Firm—Ladas & Parry

[57] ABSTRACT

A coil winding machine has a pair of gripping means respectively disposed above and under an armature held by a collet for gripping lead of wire at the beginning and end of a winding operation. Each gripping means has a gripping assembly whose gripping portion is inclined by two times as large as an inclination angle of its base portion supported by a gripping frame which is rotated reversely.

5 Claims, 7 Drawing Sheets

COIL WINDING MACHINE FOR ARMATURES

BACKGROUND OF THE INVENTION

This invention relates to a coil winding machine for winding coil around the core of an armature.

A typical conventional coil winding machine is disclosed in U.S. Pat. No. 3,927,456 in which an armature is held by a collet chuck and a pair of assemblies each comprising a chuck and a rotating flyer are disposed on the lateral sides of the armature. The machine has also a pair of tubular wire gripping means for gripping the distal end of lead of wire. The gripping means are extended laterally along the collet and are swingable so that their forward ends can be moved toward and away from the forward end of the collet. When a winding operation is started, the forward end of each gripping means is moved close to a tongue of the commutator of an armature which is held by the collet. With this state, a flyer is rotated in a certain direction so that lead of wire drawn out of the flyer can be hooked on the tongue located in its lateral direction. Then, the armature is rotated through 90 degrees so that the tongue is located in the vertically upper or lower position. At this time, the gripping means is swung away from the forward end of the collet in order to provide the wire between the gripping means and the tongue from loosening. Then, the wire between the gripping means and the tongue is cut away by a cutting means.

Furthermore, at the end of a winding operation for one armature, each gripping means is swung close to the forward end of the collet in order to cut the wire lead between the flyer and the tongue of the commutator. In this manner, the wire lead must be cut at the beginning and the end of a winding operation. However, in this conventional structure, as the gripping portion of gripping means cannot be moved sufficiently close to each tongue of the armature, a relatively long wire is wasted. In addition, a mechanism for swinging each gripping means is very complicated.

SUMMARY OF THE INVENTION

It is an object of this invention to provide a coil winding machine for winding coil around an armature wherein waste wire can be remarkably decreased in spite of provision of a relatively simple mechanism for moving each gripper.

According to this invention, there is provided a coil winding machine for winding coils around an armature which comprises: a collet means for holding rotatably the armature in the horizontal direction; a pair of chuck and flyer devices disposed on the lateral sides of the collet means so as to move toward and away from the armature held by the collet, each chuck and flyer device comprising a shroud for holding a core of the armature and a flyer; a pair of gripping means disposed above and under the collet means for gripping lead of wire at the beginning and end of a winding operation; each gripping means being moved vertically toward and away from the collet means and having a gripper whose gripping portion holds the wire lead, the gripping means comprising a rotating mechanism for rotating the gripper about its own axis so that the gripping portion can assume a vertical position and an inclined position, the gripping portion capable of moving close to an end face of a commutator of the armature at its vertical position and capable of moving close to a position approximately parallel to a tongue of the commutator to which the lead of wire is to be hooked.

The advantageous effects and features of this invention will now be explained with reference to the following drawings.

DETAILED DESCRIPTION OF THE INVENTION

Figure 1:
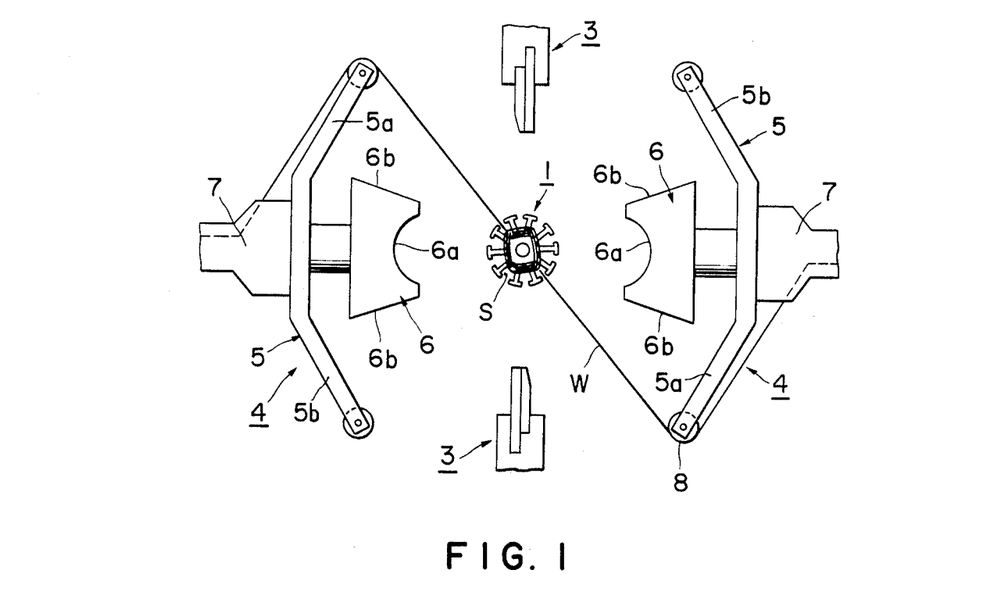
FIG. 1 is a general view showing disposition of each element of this coil winding machine.
Figure 2:
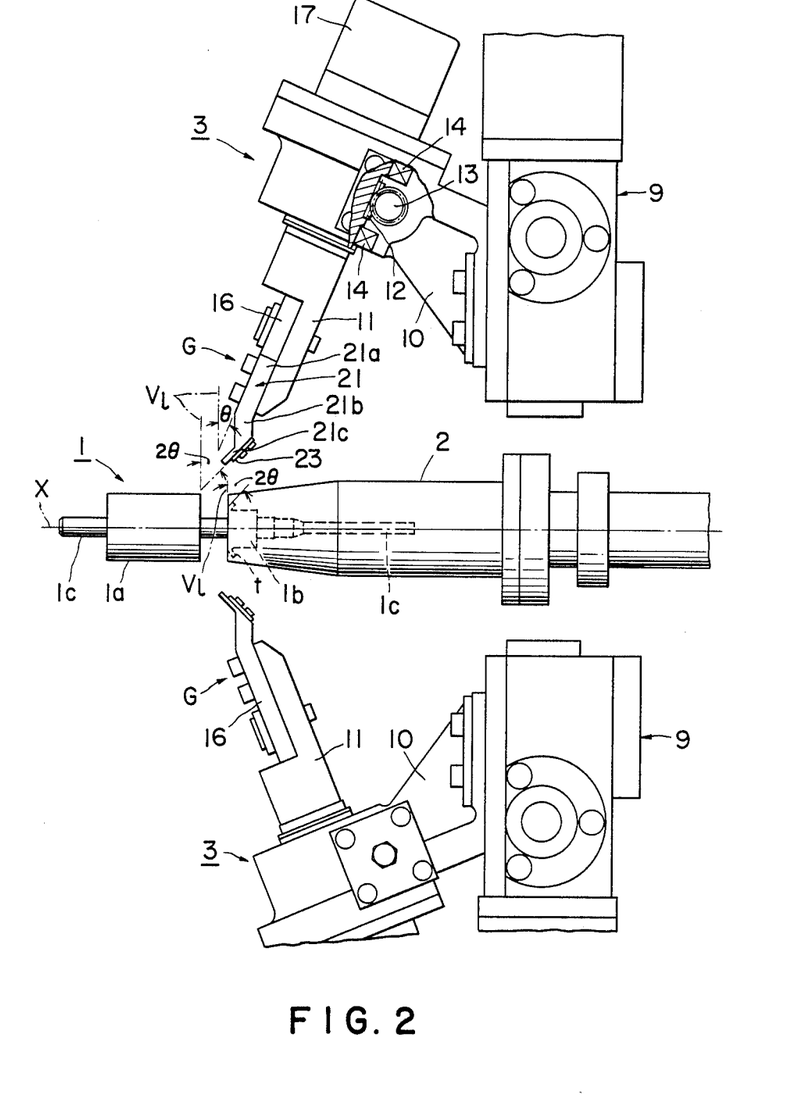
FIG. 2 is a side elevational view showing a disposition of two grippers and a collet.
Figure 3:
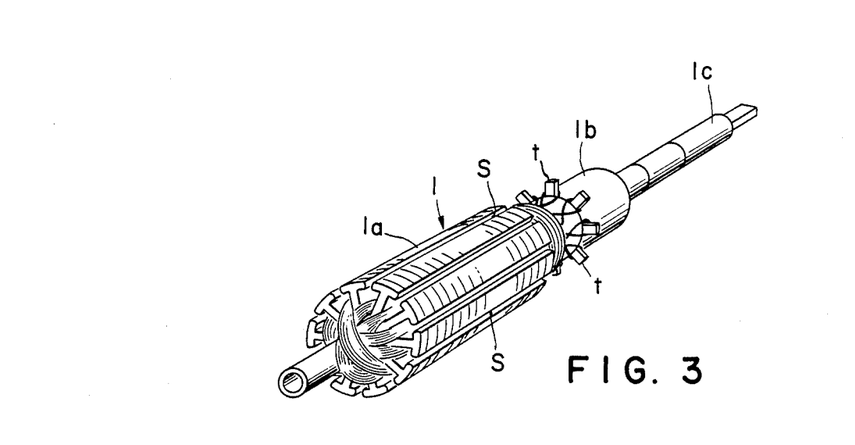
FIG. 3 is a perspective view of an armature.

In FIGS. 1 and 2, an armature 1 as shown in FIG. 3 is held by a collet 2 which is horizontally extended from the frame of a coil winding machine. At two positions over and under the armature 1 are provided a pair of gripping devices 3, 3 which are movable vertically, respectively, while on the two lateral sides of the armature 1 are provided a pair of chuck and flyer devices 4, 4 which are movable horizontally and held by a pair of supports (not shown) slidably mounted on a machine table (not shown).

The armature 1 has a core 1a in which a plurality of slots S, S, . . . , S are provided and a commutator 1b around which a plurality of tongues t, t, . . . t are provided at an equal space interval for hanging wire. The core 1a and the commutator 1b are supported on a center shaft 1c whose one end is to be inserted into the collet 2. The armature 1 is used for a rotor of an electric motor, generator or other similar machines.

Each chuck and flyer device 4 has a flyer 5 rotating around a support arm 7 and a chuck or shroud 6 connected to the support arm 7 for gripping the side circumferential surface of the core 1a of the armature 1. The flyer 5 has a guide roller 8 at the distal end of one arm 5a and the other arm 5b functions as a balancer. The chuck 6 has a semi-circular concave recess 6a, on its front face, corresponding to the curvature of the core 1a. A pair of chucks 6 hold therebetween the armature 1 in position when wire is wound into the slots S of the core 1a. Each chuck 6 has a pair of convergent surfaces 6b, 6b converging from the outside of the chuck 6 toward the inside thereof. Each convergent surface 6b functions to guide wire into the uncovered four slots S, as best seen in FIG. 3, with other slots covered with the concave recess 6a. Wire w to be wound on the core 1a is led to a wire storing device (not shown) via the guide roller 8.

Each gripping device 3 is supported by a lifting device 9 which can be moved vertically by means of a conventional mechanism such as a rack and pinion mechanism of a power cylinder. At the inner end of each lifting device 9 is held a support frame 10 for supporting a gripping frame 11 whose root portion is rotatably supported, via two bearings 14, 14 by the distal end of each support frame 10. The root portion of the gripping frame 11 has a gear 12 on the circumferential surfaces thereof. The gear 12 engages with a rack 13 which is moved laterally by a driving means such as a power cylinder (not shown). The gripping frame 11 can be rotated reversely through 180 degrees. On the root portion of the gripping frame 11 is slidably provided an actuating plate 15 for actuating a gripper G comprising a movable gripper piece 16 and a fixed gripper piece 21. The actuating plate 15 is connected to a power cylinder 17 for moving it along the gripping frame 11. The actuating plate 15 has an inclined surface 15a engaging with one end of the movable gripper piece 16 which is urged by a spring 18 in the clockwise direction as viewed in FIG. 5. One end of the movable gripper piece 16 abuts against the side surface 15a of the actuating plate 15. The actuating plate 15 is guided by a guide piece 20. The movable gripper piece 16 is pivotably supported by a support pin 19 fixed to the gripping frame 11.

Figure 5:
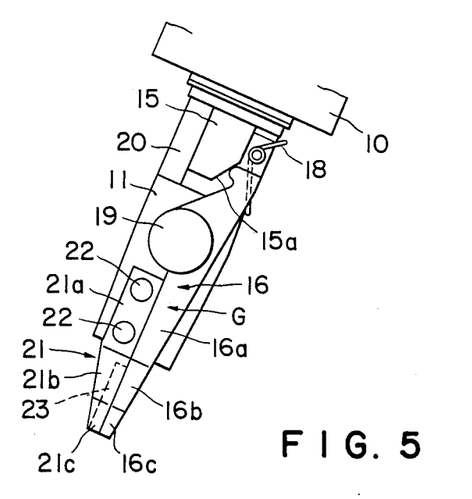
FIG. 5 is a front view of a gripper.

At the inner end of the gripping frame 11, as viewed in FIGS. 2 and 5, is fixedly provided the fixed gripper piece 21 for cooperating with the movable gripper piece 16. The fixed gripper piece 21 is fixed to the gripping frame 11 by two pins 22, 22. The gripping frame 11 extends inclinedly in the forward direction of the machine in such a manner that the base portions 16a, 21a of the two gripper pieces 16, 21 are inclined by an angle $\theta$ with respect to a vertical line V1. The two gripper pieces 16, 21 have two middle portions 16b, 21b extend vertically, in FIG. 2, from the inner ends of the base portions 16a, 21a, respectively. The lower ends of the two middle portions 16b, 21b are continued to two inner portions 16c, 21c which extend slantly in the same direction as the base portions 16a, 21a to form an angle $2\theta$ with respect to a vertical line, respectively. The inner portions 16c, 21c extend approximately parallel to the tongues t of the commutator 1b, respectively. To the inner face of each fixed gripper 21 is fixed a cutter blade 23 for cutting wire in the final stage of winding operation for one armature. The movable gripper 16 is opened when the actuating plate 15 is moved outward by the power cylinder 17 while it is closed when the actuating plate 15 is moved inwardly by the power cylinder 17.

Figure 9:
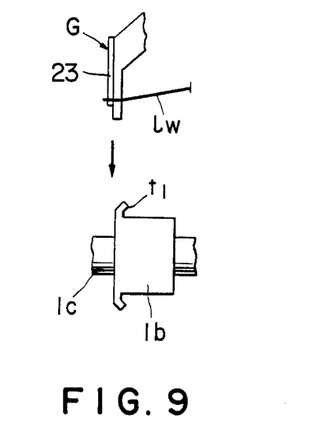
FIGS. 9 to 28 are views showing a winding operation, respectively.

Each tongue t of the commutator 1b extends from the periphery of the end face thereof in the direction opposite to the core 1a of the commutator 1b so as to form, for instance, an angle of 45 degrees between the vertical line V1 and the axis of the tongue t in a state wherein the armature 1 is held by the collet 2 horizontally, that is, the axes of the collet and the armature 1 coincide with a horizontal line X. Further, the inner part of the gripper G extends parallel to each tongue t and the base portion of the gripper G extends so as to form a half angle $\theta$ between the vertical line V1 and the axis of the base portion thereof. Accordingly, when the gripping frame 11 is rotated through 180 degrees from the state of FIG. 2, the inner part of the gripper G is located in a position in which the axis of the gripper G extends vertically as shown in FIG. 9.

Figure 6:
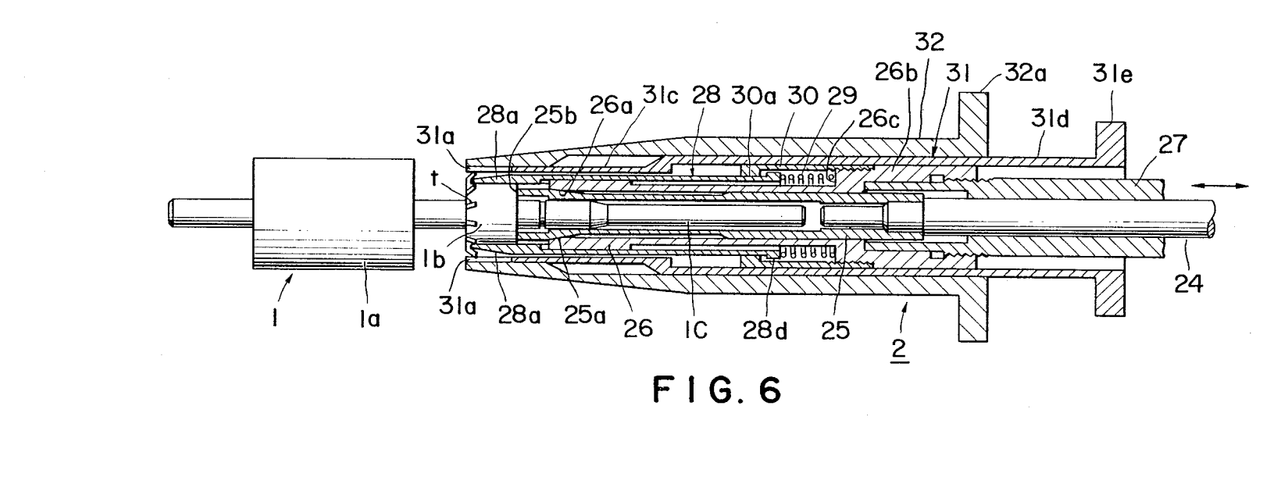
FIG. 6 is a longitudinal sectional view of the collet.

The structure of the collet 2 will now be explained with reference to FIG. 6.

Figure 7:
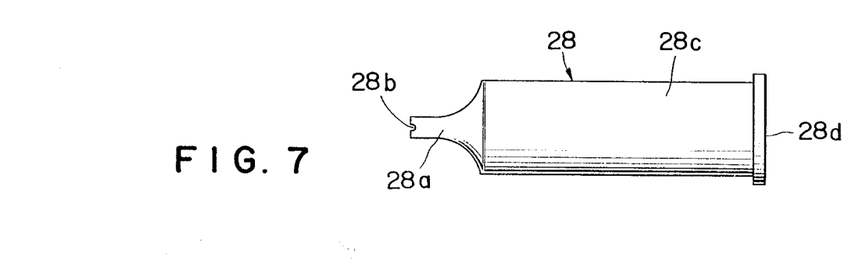
FIG. 7 is a plan view of a lead retaining member.

The collet 2 has a collet rod 24 at its center to release and grip the shaft 1c of the armature 1. To the distal end of the collet rod 24 is fixedly connected a collet sleeve 25 into which the shaft 1c of the armature is inserted. The collet sleeve 25 has a plurality of jaws 25a, 25a, . . ., 25a biting at the circumferential surface of the shaft 1c to grip the armature 1. The distal end face 25b of the collet sleeve 25 abuts against the end face of the commutator 1b. That is, the armature 1 is inserted until the end face of the commutator 1b abuts against the distal end face of the collet sleeve 25. The collet sleeve 25 is accommodated in a fastening sleeve 26 which is movable reciprocally. The inner inclined surface 26a of the distal end thereof contacts the corresponding inclined surface of each jaw 25a of the collet sleeve 25 to expand and shrink each jaw 25a during the horizontal displacement of the fastening sleeve 26. The base portion 26b of the fastening sleeve 26 is expanded in its diameter so as to accommodate therein the forward end portion of an actuating sleeve 27 in which the collet rod 24 is slidably held. The forward end portion of the sleeve 27 is fixedly connected to the base portion 26b thereof. The actuating sleeve 27 is moved reciprocally by a conventional air cylinder (not shown). The outer peripheral surface of the actuating sleeve 27 is covered with a lead retaining member 28, as shown in FIG. 7, which has a pair of lead retaining projections 28a, 28a formed on a diametrical line. The distal end of each projection 28a has a recess 28b for receiving lead of wire. The lead retaining member 28 is urged forward by a coil spring 29 which is provided between the rear end of the lead retaining member 28 and the shoulder 26c of the base portion 26b of the fastening sleeve 26. The coil spring 29 is accommodated in a holding sleeve 30 whose rear end is fixed to the base portion 26b of the fastening sleeve 26 and whose forward end restricts the forward movement of the lead retaining member 28. The lead retaining member 28 comprises a cylindrical main body 28c and the projections 28a mentioned above. At the rear end of the main body 28c thereof is provided an annular flange 28d which engages with the forward inner flange 30a of the holding sleeve 30. When the fastening sleeve 26 is moved forward to grip the shaft 1c of the armature 1, the lead retaining member 28 is moved forward at the same time, so that the distal ends of the projections 28a of the member abut against the root portions of two upper and lower tongues t, t of the commutator 1b, respectively, with leads of wire pressed against the root portions of the two tongues t, t.

Figure 8A:
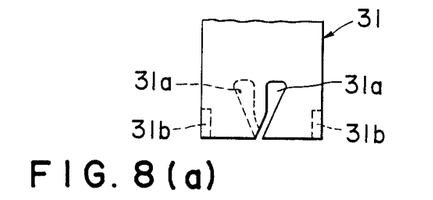
FIGS. 8(a) and 8(b) are two plan and front views of a thimble sleeve.
Figure 8B:
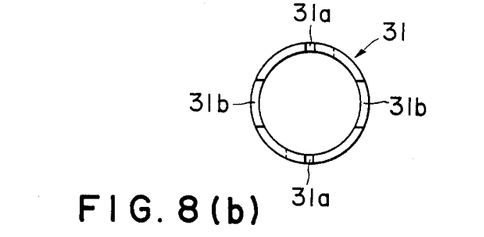

The lead retaining member 28, the holding sleeve 30 and the base portion 26b of the fastening sleeve 26 are covered with a thimble sleeve 31 whose distal forward end has a pair of guide slits 31a, 31a formed symmetrically with respect to the center axis of the thimble sleeve 31. One of the slits 31a extends slightly slantly in a certain direction with respect to the end face of the thimble sleeve 31 while the other of the slits 31a extends slightly slantly in the opposite direction with respect to the end face thereof as shown in FIG. 8. Between the two slits 31a, 31a on the end face of the thimble sleeve 31 are provided a pair of notches 31b, 31b on a diametrical line, for the exposure of each tongue t of the commutator 1b when lead of wire is hooked on the tongue t in a state wherein other tongues t are covered with the distal end of the thimble sleeve 31. The thimble sleeve 31 comprises a small diametrical portion 31c (a front portion) and a large diametrical portion 31d (a rear portion). The large diametrical portion 31d has an actuating flange 31e for moving the thimble sleeve 31 reciprocally by means of a conventional driving mechanism such as an air driving mechanism (not shown).

The thimble sleeve 31 is accommodated slidably in a cylindrical shield 32 which is moved reciprocally by the same conventional driving mechanism (not shown).

The forward (distal) end of the shield 32 can cover the tangs t, the lead retaining projection 28a and the foward end of the thimble sleeve 31. The shield 32 has an actuating flange 32a for moving it by means of a conventional driving mechanism (not shown).

The operation of the coil winding machine will now be explained mainly with reference to FIGS. 9 to 22. As best shown in FIG. 1, the two gripping devices 3, 3 and two chuck and flyer devices 4, 4 are provided symmetrically with respect to the armature 1, respectively. The movements of the two gripping devices 3, 3 and the chucks 6, 6 are the same as each other except the rotating or winding directions of the two flyers 5, 5. Accordingly, explanation is restricted to one flyer 5 located on the right side as viewed in FIG. 1 and one gripping device 3 located in the upper position.

Figure 4:
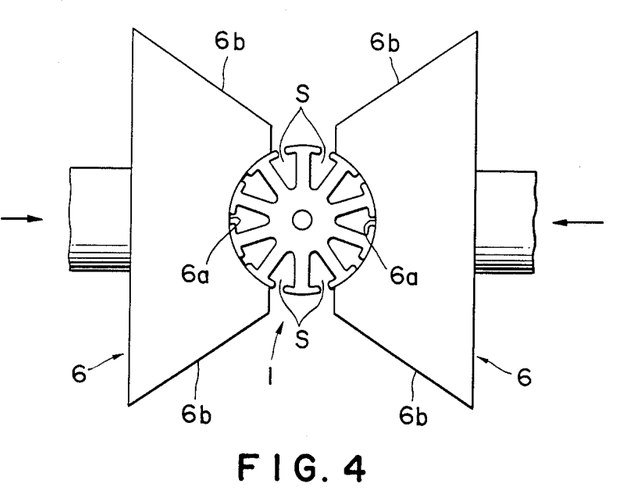
FIG. 4 is a front view showing a state wherein two shrouds hold the armature.

First, the distal end of lead lw of wire drawn out of the flyer 5 is held by the gripper G in an upward position of the commutator 1b of the armature 1 the shaft 1c of which is inserted into the collet device 2 in a state wherein the core 1a is held between the two chucks 6, 6 as shown in FIG. 4. At this time, the inner (lower) portion of the gripper G is extended vertically as shown in FIG. 9. With this state, the gripper G is lowered to a position in which the lower end of the gripper G for gripping the lead lw of wire is adjacent to the end face and the tongue $t_1$ located in a vertically upward position.

Figure 10:
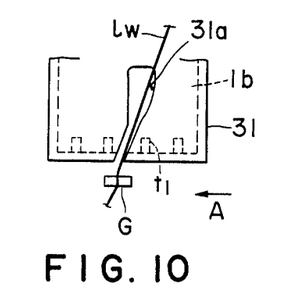
Figure 11:
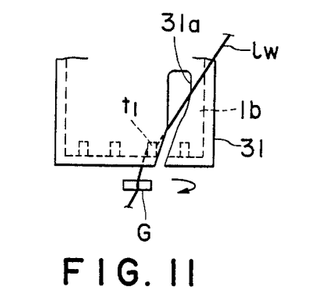
Figure 12:
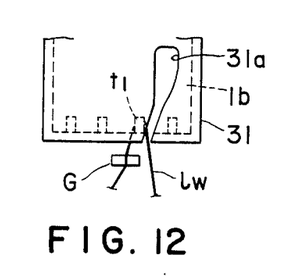
Figure 13:
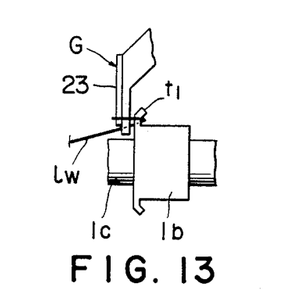
Figure 14:
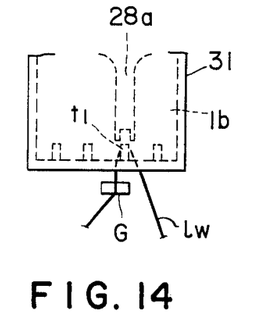
Figure 15:
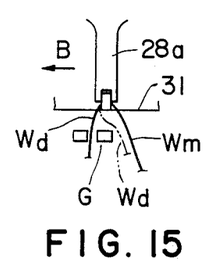
Figure 16:
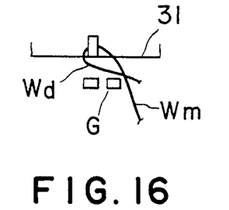

At this stage, the fastening sleeve 26, the lead retaining member 28 and the shield 32 are located in their retracted positions, respectively, while the thimble sleeve 31 is in a forward position. Then, the flyer 5 is rotated in a certain direction in which the lead lw of wire is passed through the guide slit 31a of th thimble sleeve 31 as shown in FIG. 10. In FIG. 10, the flyer 5 is located on the right side of the thimble sleeve 31 and the flyer 5 is rotated in the clockwise direction as seen from an arrow A. Thereafter, the thimble sleeve 31 is rotated through one pitch corresponding to a distance between the two adjoining tongues t, t in a certain direction in which the stretch of the wire lw is extended slantly so as to cross the tongue $t_1$ located in the vertically upward position of the horizontal axis X as shown in FIG. 11. With this state, a part of the stretch of the wire lw is extended in a position deviated from the slit 31a. Further, the flyer 5 is rotated in the reverse direction so that the wire lw is hooked on the tongue $t_1$ as shown in FIGS. 12 and 13. Thereafter, the shield 32 is moved forward to push forward a part of wire lw close to the tongue $t_1$ in order to remove the wire lw from the inside of the guide slit 31a. Next, the fastening sleeve 26 and the lead retaining member 28 are moved forward to fasten the shaft 1c of the armature 1 in the jaws 25a and the wire lw between the lead retaining projection 28a and the tongue $t_1$ as shown in FIG. 14. After this, the armature 1 is rotated slightly in a direction B in a state wherein the gripper G releases the distal end of the wire lw thereby to move the distal end wd of the wire lw under the main part wm of the wire lw as shown in FIGS. 15 and 16. During this operation, the gripper G is moved upward to a predetermined position where the gripper G is reversely rotated through 180 degrees by moving the rack 13 by the cylinder as shown in FIG. 2.

Figure 17:
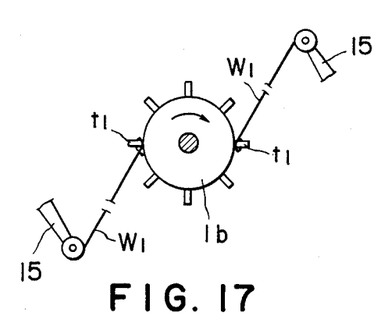
Figure 18:
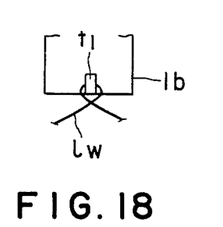

Further, the armature 1 is rotated in the clockwise direction so that the tongue $t_1$ assumes a horizontal position as shown in FIG. 17. Thus, the wire lw is wound around the tongue $t_1$, as shown in FIG. 18, to form an alpha-type attachment of the wire lw around the tang $t_1$.

Figure 19:
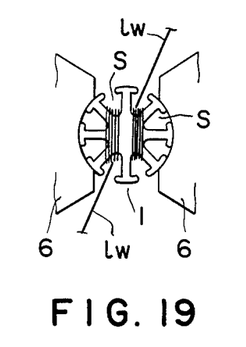

Then, the chuck and flyer devices 4 are moved close to each other to hold the armature 1 is shown in FIG. 19. At this time, four slots S of the armature 1 are opened and other slots S are covered with the concave recesses 6a of the shrouds 6. In this manner, the armature 1 is ready for the first winding operation and the two flyers 5 are then rotated to wind the wire in the slits S.

Figure 20:
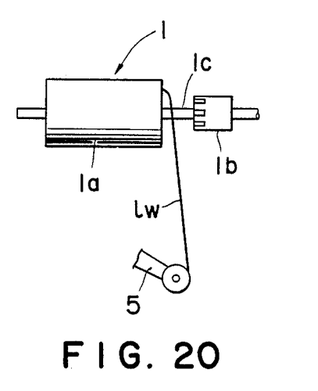
Figure 21:
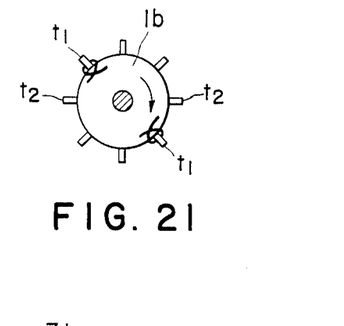
Figure 22:
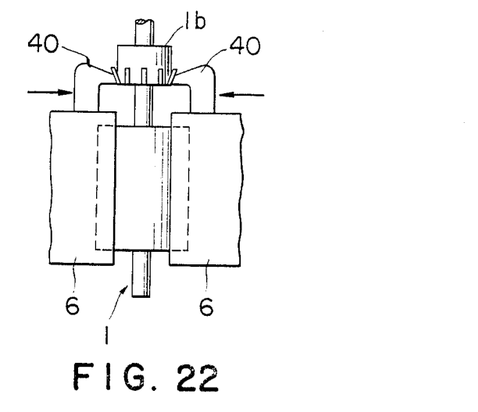
Figure 23:
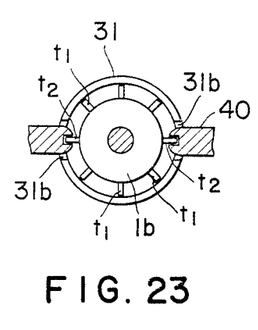
Figure 24:
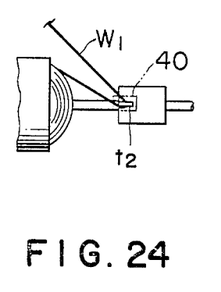
Figure 25:
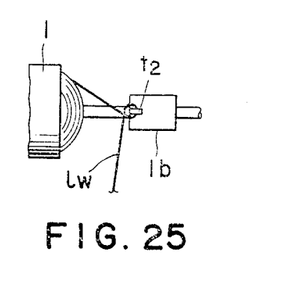

When the first winding operation is finished, the flyer 5 on the right side of FIG. 1 is located in the lower position as shown in FIG. 20. The armature 1 is rotated through one angular pitch so that next tongues $t_2$, $t_2$ take a horizontal position as shown in FIG. 21. After the armature 1 is rotated through one pitch, the chuck and flyer devices 4 are moved close to each other so that a guide member 40 movable horizontally in each device 4 embraces the tongue $t_2$ as shown in FIGS. 22 and 23. At this time, the guide member 40 is located in the notch 31b of the thimble sleeve 31 in a state wherein the shield 32 is retracted. Further, the flyer 5 is rotated reversely, that is, from the lower position to the upper position to hook the wire on the tongue $t_2$ as shown in FIG. 24. Then, each device 4 is retracted and the shield 32 is moved forward. Thereafter, the flyer 5 is rotated in a normal direction to make an alpha-attachment of the wire lw on the tongue $t_2$. Now, the armature 1 is ready for the second winding operation as shown in FIG. 25.

Figures 26, 27:
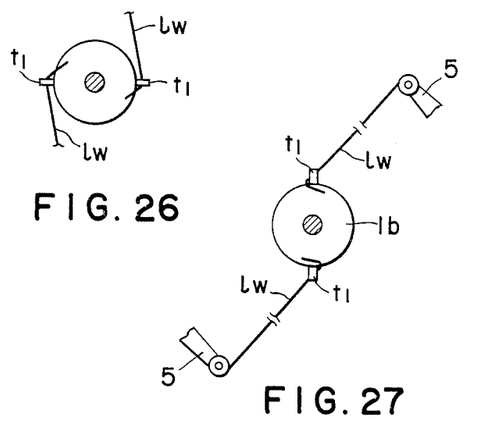
Figure 28:
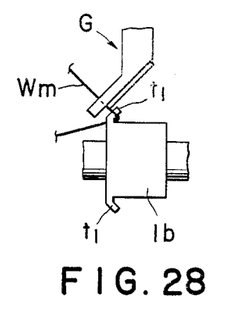

In this manner, a plurality of winding operations are repeated. After the final winding operation is finished, the wire lw is again hooked around the tongue $t_1$ in the same manner as FIGS. 21 to 24. Then, the armature 1 is rotated reversely so that each tongue $t_1$ is located in the vertical position as shown in FIG. 27. Next, each gripper G is moved toward the tongue $t_1$ to cut the wire lw at a position close to the tongue $t_1$ in a state wherein the main stretch wm of the wire lw between the flyer 5 and the gripper G is held thereby as shown in FIG. 28. Thereafter, each gripper G is retracted with the stretch wm held by the gripper G and rotated reversely around its axis for the winding operation of the next armature.

In this manner, as the main portion of the gripper G is inclined by an angle $2\theta$ while the forward end thereof for gripping the wire is inclined by a half angle $\theta$ of the inclination angle $2\theta$ of its main portion, the forward end can be disposed parallel to the end face of the commutator 1b of the armature 1 when the lead wire is hooked on the first tongue $t_1$ of the commutator 1b and can be disposed parallel to the first tongue $t_1$ thereof when the lead wire is cut after the last winding operation is finished. Therefore, the distance between the forward end of the gripper G and the hooked position on the tongue is remarkably shortened thereby to decrease waste wire. In addition, a mechanism for moving the grippers is very simple.

What we claim is:

1. A coil winding machine for winding coils around an armature having a commutator with an end face and a plurality of tongues provided around the commutator, said machine comprising:
   (a) a collet means for rotatably holding the armature in a horizontal direction;
   (b) a pair of chuck and flyer means disposed on the lateral sides of the collet means so as to move toward and away from the armature held by the collet, each chuck and flyer means comprising a shroud for holding a core of the armature and a flyer; and (c) a pair of gripping means disposed above and under the collet means for gripping leads of wire at the beginning and end of a winding operation; each gripping means being movable vertically toward and away from the collet means and having a gripper which has a gripping portion for holding the wire lead, the gripping means comprising a rotating mechanism for rotating the gripper about an axis thereof so that the gripping portion can take a vertical position and an inclined position, the gripping portion being close to an end face of a commutator on the armature at said vertical position and being close to a position approximately parallel to one of a plurality of tongues on the commutator on which the lead of wire is to be hooked.

2. A coil winding machine according to claim 1, wherein each gripping means comprises: a support frame which is movable vertically by a lifting device; a gripping frame rotatably supported by the support frame and supporting said gripper thereon; and a gripper operating means for opening and closing the gripper, said gripper having a base portion inclined by an angle with respect to a vertical line, the gripping portion of the gripper being inclined by an angle which is two times as large as the angle of said base portion.

3. A coil winding machine according to claim 1, wherein said rotating mechanism comprises a rack and pinion mechanism.

4. A coil winding machine according to claim 3, wherein the gripper comprises a movable gripper piece, a fixed gripper piece, an actuating member for swinging the movable gripper piece with respect to the fixed gripper piece, and a power cylinder for moving said actuating member.

5. A coil winding machine according to claim 4, further comprising a cutter blade provided on one of said gripper pieces.

* * * * *